US011917338B2

(12) United States Patent
Guo et al.

(10) Patent No.: US 11,917,338 B2
(45) Date of Patent: Feb. 27, 2024

(54) LIGHT SOURCE SYSTEM AND DISPLAY APPARATUS

(71) Applicant: APPOTRONICS CORPORATION LIMITED, Guangdong (CN)

(72) Inventors: Zuqiang Guo, Guangdong (CN); Ning Lu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 94 days.

(21) Appl. No.: 17/626,783

(22) PCT Filed: Jun. 28, 2020

(86) PCT No.: PCT/CN2020/098510
§ 371 (c)(1),
(2) Date: Jan. 12, 2022

(87) PCT Pub. No.: WO2021/008332
PCT Pub. Date: Jan. 21, 2021

(65) Prior Publication Data
US 2022/0303511 A1    Sep. 22, 2022

(30) Foreign Application Priority Data

Jul. 12, 2019 (CN) .......................... 201910631789.3

(51) Int. Cl.
*H04N 9/31* (2006.01)
(52) U.S. Cl.
CPC ......... *H04N 9/3152* (2013.01); *H04N 9/3158* (2013.01)
(58) Field of Classification Search
CPC .... H04N 9/312; H04N 9/3111; H04N 9/3114; H04N 9/3123; H04N 9/3141;
(Continued)

(56) References Cited

U.S. PATENT DOCUMENTS

2014/0285774 A1* 9/2014 Tajiri ................... G03B 21/208
353/38
2015/0036332 A1   2/2015 Wang
(Continued)

FOREIGN PATENT DOCUMENTS

CN   103376634 A   10/2013
CN   103869590 A    6/2014
(Continued)

OTHER PUBLICATIONS

International Search Report dated Sep. 28, 2020 for corresponding International Application No. PCT/CN2020/098510.

*Primary Examiner* — Sultan Chowdhury
(74) *Attorney, Agent, or Firm* — TAROLLI, SUNDHEIM, COVELL & TUMMINO L.L.P.

(57) ABSTRACT

Provided is a light source system, including: an excitation light source emitting excitation light; a wavelength conversion device having conversion and reflective regions located in different planes and time-sequentially located in optical path of the excitation light, the conversion region configured for converting at least part of the excitation light into excited light, and the reflective region configured for reflecting the excitation light; collection lens assembly configured to guide light from the conversion region to propagate along first direction to obtain first light, and guide the excitation light from the reflective region to propagate along second direction to obtain second light; first guide device configured to guide the excited light in the first light to exit along first path; and second guide device configured to guide the second light to propagate along second path. The first guide device combines the excited light and the second light to obtain source light.

14 Claims, 6 Drawing Sheets

(58) Field of Classification Search
CPC .. H04N 9/3152; H04N 9/3158; H04N 9/3161; H04N 9/3164; G03B 21/14; G03B 21/20; G03B 21/145; G03B 21/204; G03B 21/2013; G03B 21/2033; G03B 21/2053
See application file for complete search history.

(56) References Cited

U.S. PATENT DOCUMENTS

| | | | |
|---|---|---|---|
| 2015/0098065 A1* | 4/2015 | Tanaka | G03B 21/2013 353/84 |
| 2016/0004146 A1* | 1/2016 | Nouda | G03B 21/16 353/61 |
| 2016/0077417 A1* | 3/2016 | Ishikawa | H04N 9/3114 353/121 |
| 2016/0088273 A1* | 3/2016 | Fukui | G02B 26/007 353/31 |
| 2017/0153538 A1* | 6/2017 | Kawasumi | G02B 27/10 |
| 2018/0217480 A1* | 8/2018 | Ito | H04N 9/3158 |

FOREIGN PATENT DOCUMENTS

| | | |
|---|---|---|
| CN | 104345530 A | 2/2015 |
| CN | 105892200 A | 8/2016 |
| CN | 109491187 A | 3/2019 |
| CN | 109557752 A | 4/2019 |
| CN | 109557753 A | 4/2019 |

* cited by examiner

LIGHT SOURCE SYSTEM AND DISPLAY APPARATUS

RELATED APPLICATIONS

The present application is a U.S. National Stage application under 35 USC 371 of PCT Application Serial No. PCT/CN2020/098510, filed on 28 Jun. 2020; which claims priority from CN Patent Application No. 201910631789.3, filed 12 Jul. 2019, the entirety of both of which are incorporated herein by reference.

TECHNICAL FIELD

The present disclosure relates to the field of projection technologies, and in particular, to a light source system and a display apparatus.

BACKGROUND

This part is intended to provide background or context for specific implementations of the present disclosure in the claims. The description herein shall not be recognized as the prior art by virtue of inclusion in this part.

A light source module of a projection apparatus includes an excitation light source and a color wheel. Different regions of the color wheel have different phosphors including red phosphor and green phosphor. When blue laser light emitted from an excitation light source is irradiated on different regions of the color wheel, fluorescence of corresponding colors is excited. The fluorescence of the different colors is mixed with the laser light exited from the light source module to form white light required for projection.

SUMMARY

A first aspect of the present disclosure provides a light source system, including: an excitation light source configured to emit excitation light; a wavelength conversion device having a conversion region and a reflective region, the conversion region and the reflective region are located in different planes and time-sequentially located in an optical path of the excitation light, the conversion region is configured for converting at least a part of the excitation light into excited light, and the reflective region is configured for reflecting the excitation light; a collection lens assembly configured to guide light exited from the conversion region to propagate along a first direction to obtain first light, and guide the excitation light exited from the reflective region to propagate along a second direction to obtain second light; a first guide device configured to guide the excited light in the first light to exit along a first optical path; and a second guide device configured to guide the second light to propagate along a second optical path. The first guide device is further configured to combine the excited light propagating along the first optical path and the second light propagating along the second optical path to obtain source light, and guide the source light to propagate along a light exit path.

A second aspect of the present disclosure provides a display apparatus, including: the light source system described above; and a modulation device configured to modulate source light emitted from the light source system along the light exit path to obtain image light of an image to be displayed.

A third aspect of the present disclosure provides a wavelength conversion device, including a substrate, a conversion region and a reflective region are provided on the substrate, the conversion region is configured for converting at least a part of excitation light into excited light, the reflective region is configured for reflecting the excitation light, and light exit surfaces of the conversion region and the reflective region are located in different planes.

A fourth aspect of the present disclosure provides a wavelength conversion device, including a substrate, a conversion region and a reflective region are provided on the substrate, the conversion region is configured for converting at least a part of excitation light into excited light, the reflective region is configured for reflecting the excitation light, and light exit surfaces of the conversion region and the reflective region are located in different planes.

BRIEF DESCRIPTION OF DRAWINGS

In order to describe the technical solutions in the embodiments/implementations of the present disclosure more clearly, accompanying drawings required for describing the embodiments/implementations are illustrated as follows. It is appreciated that, the accompanying drawings in the following description show merely some embodiments/implementations of the present disclosure, and person of ordinary skill in the art may further derive other drawings from these accompanying drawings without creative efforts.

| Reference signs | |
|---|---|
| Display apparatus | 10 |
| Light source system | 100, 200 |
| Excitation light source | 110, 210 |
| Excitation light | a |
| Positive lens | 111 |
| Negative lens | 112 |
| First homogenizing device | 113, 213 |
| First guide device | 130, 230 |
| Second guide element | 131 |
| First guide element | 135 |
| First region | 135A |
| Second region | 135B |
| Second homogenizing device | 137, 237 |
| Second guide device | 150, 250 |
| Reflective element | 151 |
| First lens | 152 |
| Third guide element | 156 |
| Scattering element | 157 |
| Relay lens | 114, 132, 136, 158, 159, 211, 236 |
| Supplementary light source | 120, 220 |
| Supplementary light | E |
| Collection lens assembly | 170, 270 |
| Optical axis | D |
| First light | B |

-continued

| Reference signs | |
|---|---|
| Excited light | B1 |
| Unconverted excitation light | B2 |
| Second light | C |
| Wavelength conversion device | 180, 280 |
| Light incident surface | 181 |
| Groove | V |
| Substrate | 182 |
| Conversion region | Y |
| Reflective region | B |
| Drive unit | 185 |
| Modulation device | 500 |
| First optical path | L1 |
| Second optical path | L2 |
| Light exit path | L3 |

The present disclosure is further described in the following detailed description with reference to the accompanying drawings.

DESCRIPTION OF EMBODIMENTS

In order to make the objectives, features and advantages of the present disclosure more comprehensible, the present disclosure is described in detail below with reference to the accompanying drawings and specific embodiments. It should be noted that without conflict, the embodiments of the present disclosure and features of the embodiments may be combined with each other.

Many specific details are set forth in the following description to facilitate a full understanding of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Unless otherwise defined, all technical and scientific terms used herein have the same meaning as commonly understood by those skilled in the technical field of the present disclosure. The terms used in the specification of the present disclosure herein are only for the purpose of describing specific embodiments, and are not intended to limit the present disclosure.

Figure 1:
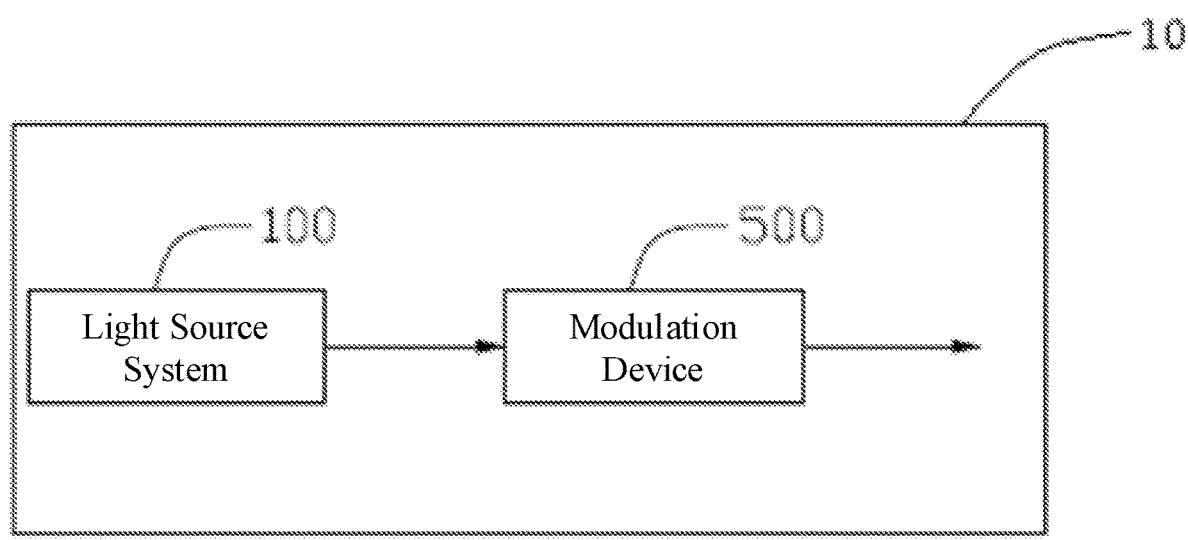
FIG. 1 is a schematic structural diagram of a display apparatus according to an embodiment of the present disclosure.

Referring to FIG. 1, the present disclosure provides a display apparatus 10. The display apparatus 10 may be a projection apparatus, such as a laser TV, a theater projector, an engineering machine, or an educational projector. The display apparatus 10 includes: a light source system 100 and a modulation device 500. The light source system 100 is configured to generate source light, and the modulation device 500 is configured to modulate the source light according to original image data of each pixel in an input image to be displayed, to obtain image light of the image to be displayed.

Figure 2:
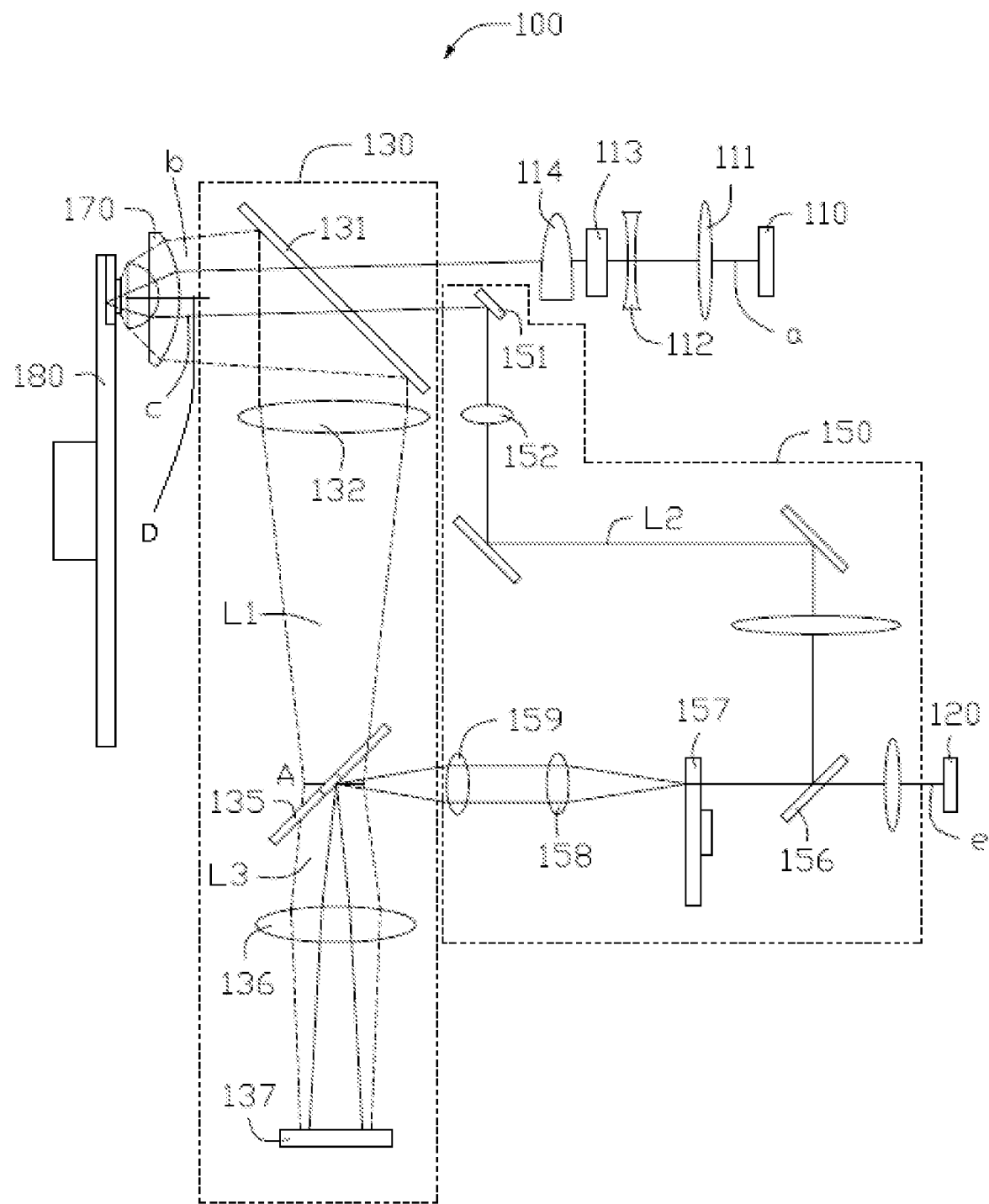
FIG. 2 is a schematic structural diagram of a light source system shown in FIG. 1 according to a first embodiment of the present disclosure.

Referring to FIG. 2, the light source system 100 includes an excitation light source 110, a wavelength conversion device 180, and a collection lens assembly 170. The excitation light source 110 is configured to emit excitation light a. The wavelength conversion device 180 is configured to receive the excitation light a, convert a part of the excitation light A into excited light, and further reflect another part of the excitation light A. The excited light from the wavelength conversion device 180 and the reflected excitation light A finally propagate along a light exit path L3 to obtain the source light output from the light source system 100. The collection lens assembly 170 is configured to converge the excitation light A to a surface of the wavelength conversion device 180, and collimate the light from the wavelength conversion device 180.

The excitation light source 110 may be a blue light source for emitting blue light as the excitation light a. It can be understood that, the excitation light source 110 may alternatively be an ultraviolet light source for emitting ultraviolet light as the excitation light a. The excitation light source 110 includes a light emitter, which in an embodiment is a laser. In an alternative embodiment, the light emitter includes a light-emitting diode. The specific number of light emitters included in the excitation light source 110 may be selected flexibly as required. For example, the excitation light source may include one light emitter or an array of light emitters.

Figure 3A:
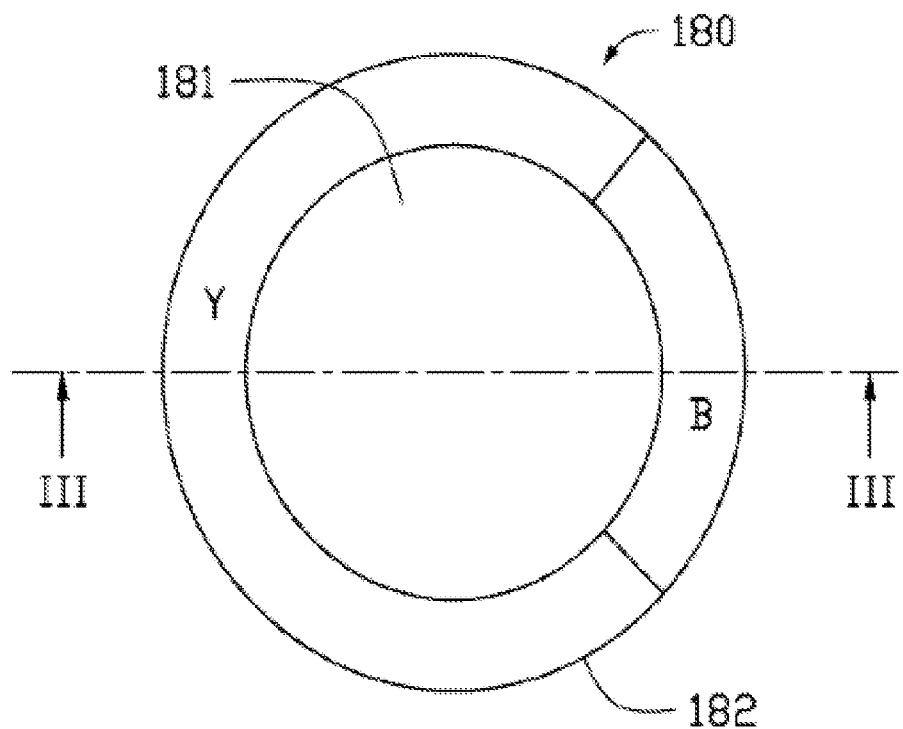
FIG. 3A is a top view of a wavelength conversion device shown in FIG. 2.
Figure 3B:
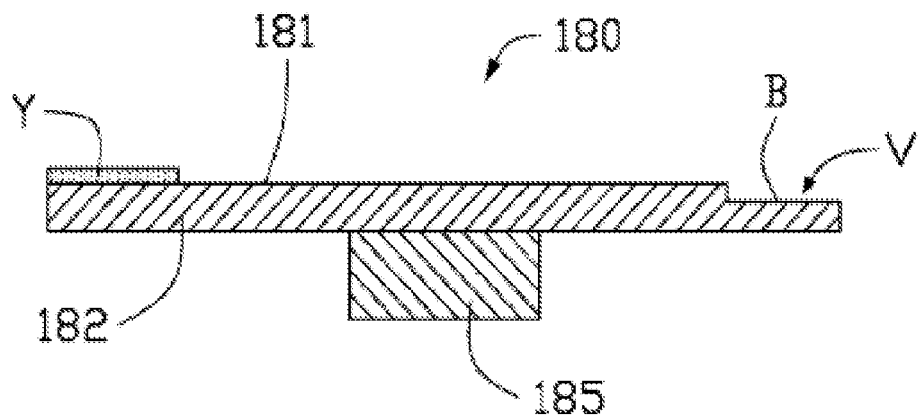
FIG. 3B is cross-sectional view of the wavelength conversion device shown in FIG. 2 taken along line III-III.

Referring to FIG. 2, FIG. 3A and FIG. 3B, the wavelength conversion device 180 includes a substrate 182 and a drive unit 185. The wavelength conversion device 180 is configured to receive the excitation light a. The substrate 182 includes a light incident surface 181 and a bottom surface (not labeled) opposite to each other. The light incident surface 181 is disposed on a light incident side on the substrate 182 and the wavelength conversion device 180, and is configured for receiving the excitation light a. The drive unit 185 is disposed on the bottom surface of the substrate 182. A conversion region Y and a reflective region B located in different planes are disposed on the substrate 182. That is, the conversion region Y and the reflective region B are located in different planes. The conversion region Y and the reflective region B are both provided on the substrate 182 and are located on the light incident side of the wavelength conversion device 180. The drive unit 185 is configured for driving the substrate 182 to move periodically, and making the conversion region Y and the reflective region B sequentially located in an optical path of the excitation light a.

In an embodiment, the substrate 182 is substantially disc-shaped. The conversion region Y and the reflective region B are arranged along the circumference of the substrate 182. For example, the conversion region Y shapes like a part of a ring, the reflective region B also shapes like a part of a ring, and the conversion region Y and the reflective region B together form a ring shape. The conversion region Y and the reflective region B are located in different planes. In an optional embodiment, a groove V is formed in the reflective region B. A bottom wall of the groove V is provided with a reflective element, a reflective material, a dichroic color sheet or a film that can reflect excitation light, so as to reflect the excitation light. The conversion region Y is provided on the light incident surface 181. The light incident surface 181 is an upper plane of the substrate 182, which does not include surfaces of the groove V, and the light incident surface 181 is connected to a side wall of the groove V. That is, the side wall of the groove V is connected to the plane the conversion region Y is located, such that the conversion region Y and the reflective region B are located in different planes. Alternatively, in another embodiment, a groove V is formed in the conversion region Y. A bottom wall of the groove V is provided with a wavelength conversion material. The wavelength conversion material is configured for converting incident excitation light into excited light of at least one color. The light incident surface 181 is an upper plane of the substrate 182, which does not include surfaces of the groove V, and the light incident surface 181 is connected to a side wall of the groove V. The reflective region B is provided on the light incident surface 181, such that the conversion region Y and the reflective region B are located in different planes. In an alternative embodiment, the conversion region Y and the reflective region B are provided on the light incident side of the substrate 182. A protruding portion protruding towards the light incident side (that is, a direction away from the bottom surface of the substrate 182) is provided in the conversion region Y of the wavelength conversion device 180. A wavelength conversion material is provided on a surface of the protruding portion. The wavelength conversion material is configured for converting at least a part of the excitation light into excited light. The reflective region B is provided on the light incident surface 181. The light incident surface 181 is an upper plane of the substrate 182, which does not include surfaces of the protruding portion, and an edge of the protruding portion is connected to the plane the reflective region B is located (the light incident surface 181), such that the conversion region Y and the reflective region B are located in different planes.

Further, the conversion region Y is provided with a wavelength conversion material, which is a material that can convert light incident on the wavelength conversion material into light of different wavelengths. The wavelength conversion material includes common materials such as a phosphor, a nano-luminescent material or quantum dots. The conversion region Y is configured for converting incident excitation light into excited light of other wavelengths. Partial excitation light that cannot be converted by the conversion region Y in the incident excitation light will be transmitted out together with the excited light. In an embodiment, a yellow phosphor is provided in the conversion region Y, for generating yellow excited light (yellow fluorescence) under the excitation of the excitation light a. It can be understood that, the conversion region Y may be provided with a red phosphor and a green phosphor in different sections. The red phosphor and the green phosphor are sequentially located in the optical path of the excitation light a, thereby generating red fluorescence and green fluorescence sequentially. Alternatively, the conversion region Y is provided with a yellow phosphor, to emit yellow fluorescence. In other embodiments, the conversion region Y may further be provided with wavelength conversion materials for generating fluorescence of other colors, for example, an orange phosphor and a magenta phosphor. The reflective region B is provided with a reflective material to reflect the incident excitation light a, e.g., through diffuse reflection or specular reflection. Since the excitation light A is Gaussian light, the conversion region Y specularly reflects the excitation light a, which helps the excitation light reflected from the reflective region B still obey Gaussian distribution, thus keeping a relatively small light divergence angle, such that the subsequent optical path (the reflective element 151) recovers the reflected excitation light. The reflective region B may be provided with a metal reflective layer or metal reflective film with reflectivity higher than a predetermined value to achieve specular reflection.

In the present disclosure, the light exit surfaces of the conversion region Y and the reflective region B are located in different planes. The thickness of the wavelength conversion material is close to the thickness of the reflective material. That is, light exit surfaces of the wavelength conversion material in the conversion region Y and the reflective material in the reflective region B are located in different planes. In an embodiment, the conversion region Y and the reflective region B may be located in the same plane or in different planes. The thicknesses of the wavelength conversion material and the reflective material may satisfy a certain condition, such that the light exit surfaces of the wavelength conversion material in the conversion region Y and the reflective material in the reflective region B are located in different planes.

The substrate 182 rotates periodically. Under the irradiation of the excitation light a, the conversion region Y and the reflective region B are periodically located in the optical path of the excitation light a, the wavelength conversion device 180 periodically outputs yellow excited light and reflected blue excitation light a. The wavelength conversion device 180 is a reflective color wheel, for reflecting the generated excited light and unconverted excitation light. That is, the conversion region Y is configured for reflecting the incident unconverted excitation light a, and reflecting the excited light on the surface thereof. The excited light and the unconverted excitation light A transmitted from the conversion region Y are both Lambertian light, and have a larger divergence angle compared with the excitation light A obeying the Gaussian distribution emitted from the excitation light source 110.

The collection lens assembly 170 is disposed between the wavelength conversion device 180 and the excitation light source 110, and is close to the light incident side of the wavelength conversion device 180. The collection lens assembly 170 includes a plurality of lenses arranged in sequence. The lenses have different focal lengths. A lens with a smaller focal length is closer to the wavelength conversion device 180.

The collection lens assembly 170 is configured to guide the excitation light A obeying the Gaussian distribution emitted from the excitation light source 110 to be incident on the wavelength conversion device 180, and converge the excitation light A with a certain beam diameter, such that the excitation light A forms a relatively small spot on the surface of the wavelength conversion device 180. An optical axis D of the collection lens assembly 170 is an axis of symmetry of the collection lens assembly 170. The excitation light A is incident on the collection lens assembly at a position deviated from the optical axis D. The collection lens assembly 170 is configured to change a propagation direction of the incident excitation light a, such that the excitation light A is converged towards the optical axis D and is incident on the surface of the wavelength conversion device 180 obliquely (i.e., in a non-perpendicular manner). In an embodiment, the excitation light A is incident on the collection lens assembly 170 along a direction parallel to the optical axis D. The light exit surface of the conversion region Y is arranged on a focal plane (a plane where a focal point is located) of the collection lens assembly 170. After the excitation light is guided by the collection lens assembly 170, an incident position of the excitation light on the conversion region Y is the focal point of the collection lens assembly 170.

Figure 4:
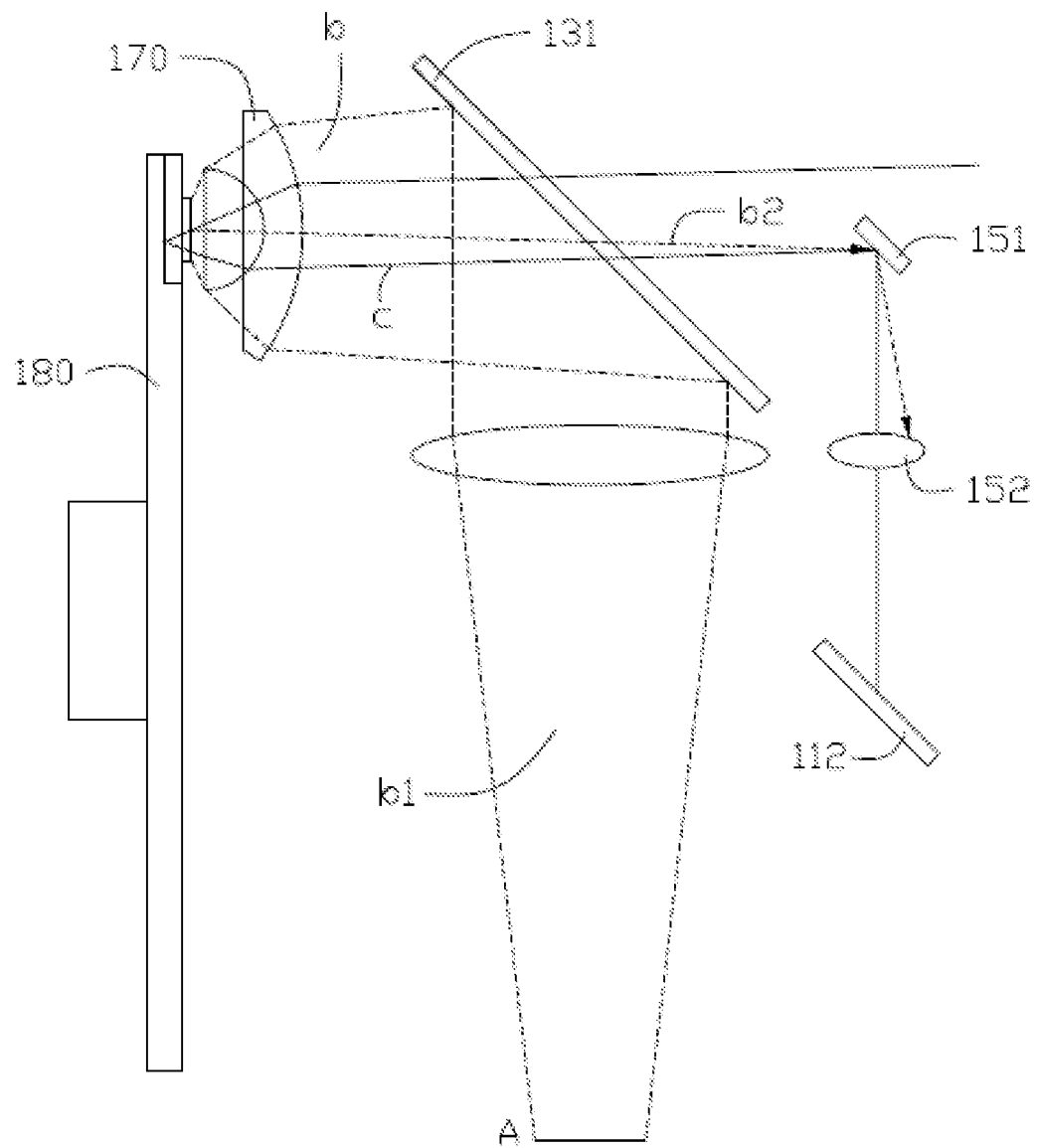
FIG. 4 is a schematic diagram of partial optical path of reflected excitation light and unconverted excitation light in the light source system shown in FIG. 2.

Referring to FIG. 2 and FIG. 4, the conversion region Y receives the obliquely incident excitation light a. The excited light and the unconverted excitation light transmitted from the conversion region Y both obey Lambertian distribution. After the excited light and the unconverted excitation light pass through the collection lens assembly 170, first light B propagating along the first direction is obtained. The first light B includes excited light B1 and unconverted excitation light B2. Since the collection lens assembly 170 is configured to collimate light transmitted from the wavelength conversion device 180, the light (the excited light and the unconverted excitation light) transmitted from the conversion region Y becomes substantially parallel light after passing through the collection lens assembly 170, and an angle between the first direction and the optical axis D is relatively small. In an embodiment, since a light exit position on the conversion region Y is the position of the focal point of the collection lens assembly 170, the light transmitted from the conversion region Y becomes the parallel first light B after passing through the collection lens assembly 170. The first direction is parallel to the optical axis D.

Since the light exit surfaces of the reflective region B and the conversion region Y are located in different planes perpendicular to the optical axis D, light transmitted from the reflective region B and light transmitted from the conversion region Y are incident on different positions of the collection lens assembly 170, and the collection lens assembly 170 guide the light from the conversion region Y and the light from the reflective region B to propagate along different directions, respectively. For example, the collection lens assembly 170 guides the reflected excitation light from the reflective region B to propagate in the second direction to obtain second light c. The second direction is different from the first direction. The second light C exits the collection lens assembly 170 at a position deviated from the optical axis D, and propagates towards the optical axis D.

Since the excitation light A is incident on the surface of the wavelength conversion device 180 obliquely, optical paths of the incident excitation light and the emergent reflected excitation light of the wavelength conversion device 180 are separate (not interfere with each other), such that the subsequent optical path collects the reflected excitation light transmitted from the wavelength conversion device 180. Since the light exit surfaces of the reflective region B and the conversion region Y are respectively provided on different planes of the wavelength conversion device 180, the unconverted excitation light transmitted from the collection lens assembly 170 and the reflected excitation light propagate along the first direction and the second direction respectively. That is, the unconverted excitation light transmitted from the wavelength conversion device 180 and the reflected excitation light propagate along different directions, such that the unconverted excitation light propagating along the first direction is removed from the subsequent optical path.

As shown in FIG. 2, the light source system 100 further includes a first guide device 130 and a second guide device 150. The first guide device 130 includes a second guide element 131. The second guide element 131 is configured for guiding the excitation light A transmitted from the excitation light source 110 to be incident on the wavelength conversion device 180, guiding the excited light B1 in the first light B to propagate along a first optical path L1, and guiding the unconverted excitation light B2 and the second light C in the first light to be incident on the second guide device 150. The second guide element 131 may be a dichroic beam splitter, for transmitting blue light and reflecting red light and green light. That is, the second guide element 131 reflects the excited light B1, and allows the blue second light C and the unconverted excitation light B2 to pass through. The first optical path L1 is an exclusive transmission path of the excited light B1 transmitted from the second guide element 131. That is, only the excited light B1 is transmitted in the first optical path L1, while the second light C and the unconverted excitation light B2 are not transmitted.

The second guide device 150 includes a reflective element 151 and a first lens 152. The reflective element 151 is configured for guiding the second light C to propagate along a second optical path L2, and guiding at least a part of the unconverted excitation light B2 in the first light B to be deviated from the second optical path L2. The second optical path L2 is an exclusive transmission path of the second light C transmitted from the second guide element 131. That is, only the second light C is transmitted in the second optical path L2, while the first light B is not transmitted. For example, the reflective element 151 has a relatively small reflective surface, to reflect the second light C obeying Gaussian distribution from the second guide element 131 to the first lens 152. The first lens is configured for guiding the second light C to propagate along the second optical path L2. The unconverted excitation light B2 in the first light B and the second light C have the same color and different transmission directions. The second light C propagates along the second optical path L2, and the unconverted excitation light B2 propagates on a path in a different direction from the second optical path L2. The unconverted excitation light B2 in the first light B has a relatively large beam diameter. A part of the unconverted excitation light B2 is irradiated on the reflective element 151, and the rest of the unconverted excitation light B2 is not received by the reflective element 151. The unconverted excitation light B2 irradiated on the surface of the reflective element 151 is guided by the reflective element 151 to a surrounding space outside the first lens 152 and is not received by the first lens 152.

The second guide device 150 includes a scattering element 157 and relay lenses 158 and 159. The scattering element 157 is configured for scattering light in the second optical path L2 to eliminate the coherence of laser light, thus alleviating a laser speckle phenomenon. The scattering element 157 is further provided with an anti-reflective film. The second light C from the first lens 152 is guided by the scattering element 157 and the relay lenses 158 and 159, and then incident on the first guide device 130.

As shown in FIG. 2, the light source system 100 further includes a supplementary light source 120 configured to emit laser light as supplementary light e. The supplementary light source 120 is configured to emit red and green laser light as the supplementary light e. Since the yellow fluorescence generated by the wavelength conversion device 180 contains less red fluorescence and more green fluorescence, the supplementary light e of the present disclosure includes red laser light to compensate for the red fluorescence in the yellow fluorescence. As a result, avoiding filtering out excess green fluorescence helps to ensure color coordinates of white light during proportioning for the white light, and thus improve the optical efficiency in the optical system. In addition, due to the broad spectrum of the excited light (fluorescence), the color purity of the red and green light obtained after fluorescence spectroscopy is low, and the color gamut of the projection display is relatively small, which is not suitable for applications requiring a large color gamut, such as laser TV and digital cinema. The addition of the supplementary light source 120 that provides red and green laser light helps to improve the color purity of the primary-color light emitted from the light source system 100 and expands the color gamut of the display apparatus 10. In addition, by spectroscopy of the yellow fluorescence, less red fluorescence and more green fluorescence are obtained. During proportioning for the white light, excess green fluorescence needs to be filtered out to ensure the color coordinates of the white light, resulting in lower optical efficiency of the yellow fluorescence. The addition of red and green laser light in the supplementary light can help to improve the brightness of yellow light emitted from the light source system 100.

In other embodiments, the supplementary light source 120 is configured to emit supplementary light e of a single color, e.g., red laser light or green laser light. When the conversion region Y is located in the optical path of the excitation light, the supplementary light source 120 is turned on to emit the supplementary light e. When the reflective region B is located in the optical path of the excitation light, the supplementary light source 120 is turned off and does not emit light. In an alternative embodiment, the supplementary light may also be laser light of another color or laser light of multiple colors, or light of one or more colors other than laser light. In an alternative embodiment, the light source system 100 does not include the supplementary light source 120.

The second guide device further includes a third guide element 156. The second light C propagates along the second optical path. The supplementary light e is guided by the third guide element 156 to be combined with the second light C and propagates along the second optical path L2. For example, the third guide element 156 is a dichroic beam splitter, which transmits red and green light and reflects blue light. Light transmitted from the third guide element 156 enters the relay lens 158 through the scattering element 157.

Figure 5:
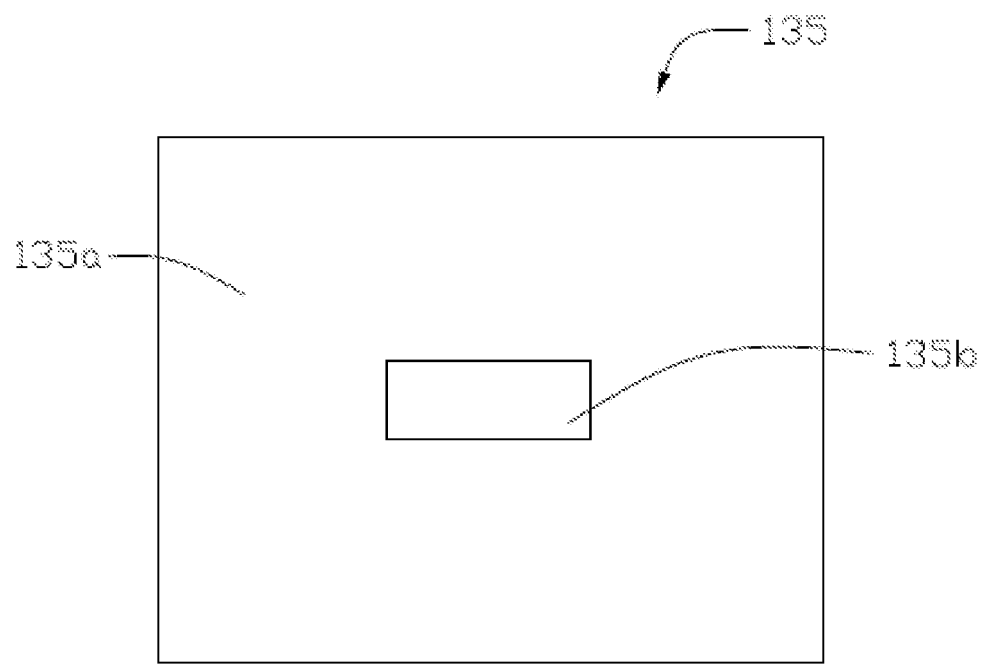
FIG. 5 is a top view of a first guide element shown in FIG. 2.

Referring to FIG. 2, FIG. 4, and FIG. 5, the first guide device 130 further includes a first guide element 135. The first guide element 135 is configured for combining the excited light B1 propagating along the first optical path L1 with the second light C and the supplementary light e propagating along the second optical path L2 to obtain the source light, and guiding the source light to propagate along the light exit path L3. That is, the first optical path L1 is a transmission path of the excited light B1 between the second guide element 131 and the first guide element 135, and the second optical path L2 is a transmission path of the second light C between the second guide element 131 and the first guide element 135. The light exit path L3 is a transmission path of the source light from the first guide element 135 to a position at which the source light is output from the light source system 100. In an embodiment without the supplementary light source 120, the first guide element 135 is configured for combining the excited light B1 propagating along the first optical path L1 and the second light C propagating along the second optical path L2 to obtain the source light, and guiding the source light to propagate along the light exit path L3. For example, the first guide element 135 includes a first region 135A and a second region 135B that do not overlap each other. The second region 135B is arranged in a central region of the first guide element 135, but is not limited to be located in the central region. The first region 135A surrounds the second region 135B. The first region 135A is configured for guiding the excited light B1 transmitted from the second guide element 131 to the light exit path L3, and the second region 135B is configured for guiding the second light C transmitted from the relay lens 159 in the second guide device 150 and the supplementary light e to the light exit path L3. For example, the first region 135A of the first guide element 135 is coated with an anti-reflective film, and the second region 135B is coated with a reflective film. The first region 135A is configured for transmitting the excited light B1 propagating along the first optical path L1. The second light C and the supplementary light e are laser light, with a small light divergence angle and a small spot area. The second region 135B is configured for reflecting the second light C and the supplementary light e. In an alternative embodiment, the position of the second region 135B is not limited to the central region of the first guide element 135, and the first region 135A is not limited to surrounding the second region 135B.

As shown in FIG. 2, the first guide device 130 further includes a relay lens 132. The excited light B1 from the second guide element 131 passes through the relay lens 132 to form an intermediate image A on the first guide element 135. Through the optical path design, for example, by adjusting the focal length and position of the relay lens 132, the size of the intermediate image A can be as large as possible, such that the fluorescence loss in the light combining process of the first guide element 135 is reduced. As the size of the intermediate image A increases, the beam angle of the excited light B1 decreases (i.e., the divergence angle decreases), and the spot area of the excited light on the first guide element 135 increases. A smaller beam angle corresponds to higher transmission efficiency of the first guide element 135, which effectively improves the utilization of the excited light B1.

A first homogenizing device 113 for homogenizing the excitation light A is further disposed between the excitation light source 110 and the wavelength conversion device 180. The first homogenizing device 113 is a fly-eye lens (single fly-eye lens or double fly-eye lenses). A positive lens 111 and a negative lens 112 are disposed between the first homogenizing device 113 and the excitation light source 110. A relay lens 114 is disposed between the first homogenizing device 113 and the second guide element 131. The excitation light A emitted from the excitation light source 110 passes through the positive lens 111, the negative lens 112, the first homogenizing device 113, and the relay lens 114 sequentially, and then is incident on the second guide element 131.

A second homogenizing device 137 for homogenizing light transmitted from the first guide element 135 is disposed on the light exit path L3. The second homogenizing device 137 is a fly-eye lens (single fly-eye lens or double fly-eye lenses), and a relay lens 136 is further disposed between the second homogenizing device 137 and the first guide element 135.

It should be noted that, the first guide device 130 and the second guide device 150 may further include other relay lenses or reflective elements for guiding light, which are not described in detail herein.

In an embodiment, the light exit surfaces of the conversion region Y and the reflective region B on the wavelength conversion device 180 are located in different planes, such that the reflected excitation light (second light c) transmitted from the collection lens assembly 170 and the unconverted excitation light b2 propagate along different directions. In addition, the reflective element 151 separates the unconverted excitation light b2 from the reflected excitation light, to prevent the unconverted excitation light b2 from being mixed in the excited light B1 to affect color coordinates of light emitted from the light source system 100, thereby improving the projection display quality of the display apparatus 10.

Figure 6:
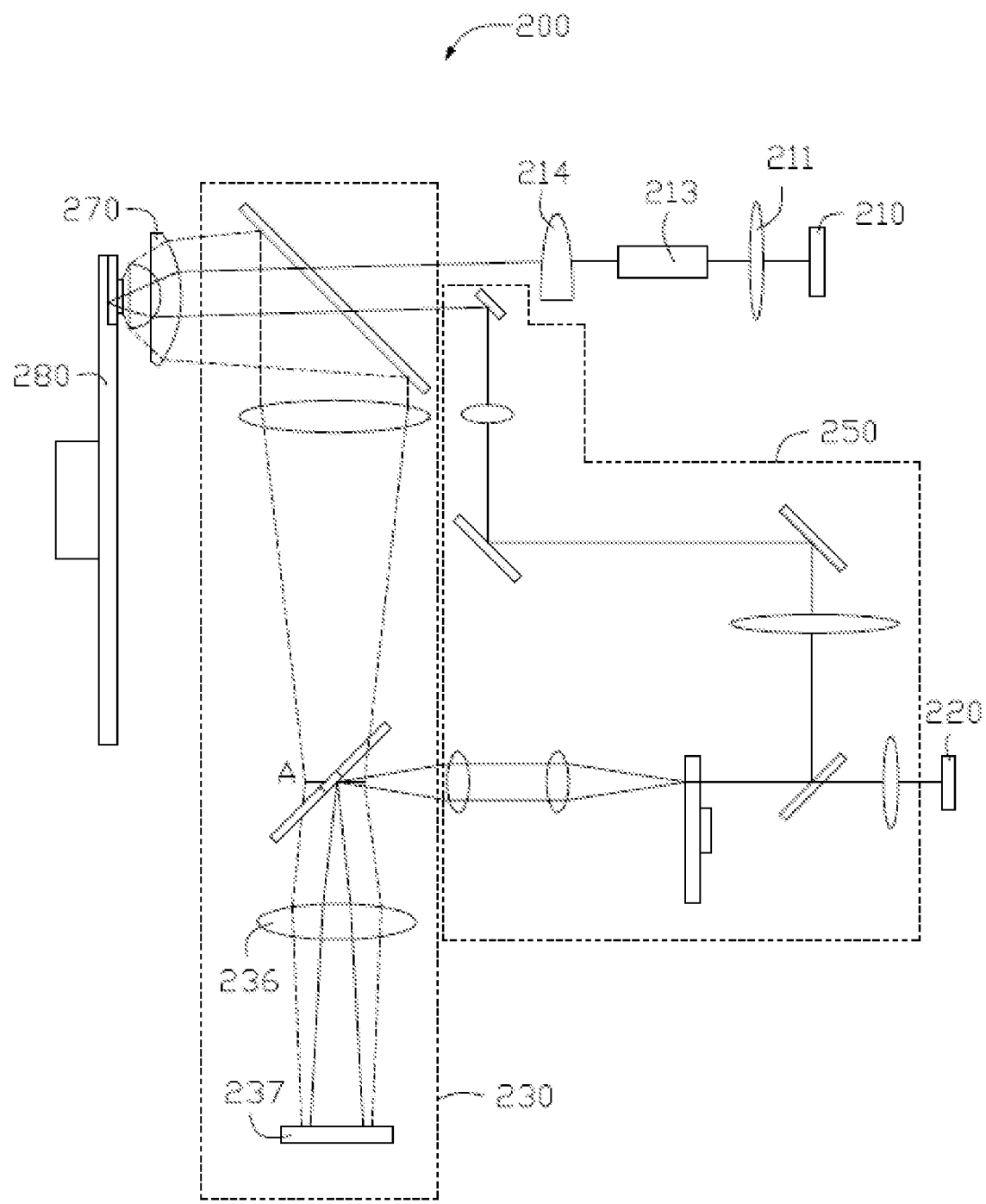
FIG. 6 is a schematic structural diagram of a light source system according to a second embodiment of the present disclosure.

Referring to FIG. 6, a second embodiment of the present disclosure provides a light source system 200. The light source system 200 includes an excitation light source 210, a supplementary light source 220, a first guide device 230, a second guide device 250, a collection lens assembly 270, and a wavelength conversion device 280. The light source system 200 is mainly different from the light source system 100 in that, at least one of the first homogenizing device 213 and the second homogenizing device 237 in the light source system 200 is an optical integrator rod, which helps to reduce the manufacturing difficulty and cost, and improve the cost performance of the display apparatus 10. In order to improve the homogenizing effect, in the light source system 200, the types and/or focal lengths of relay lenses near the first homogenizing device 213 and the second homogenizing device 237 can be adjusted. For example, the positive lens 111 and the negative lens 112 may be replaced with a relay lens 211, the relay lens 114 may be replaced with a relay lens 214, and the relay lens 136 is replaced with a relay lens 236, thereby improving the homogenizing effect of the first homogenizing device 213 and the second homogenizing device 237. Except for the foregoing differences from the light source system 100, other structures and the working principle of the light source system 200 provided in the second embodiment of the present disclosure are similar to those of the light source system 100, and details thereof are not repeated herein.

The light source system 200 provided in the second embodiment of the present disclosure can prevent the unconverted excitation light from being mixed into the excited light and thus affecting the color coordinates of the light emitted from the light source system 200, which helps to improve the projection display quality of the display apparatus 10. In addition, the manufacturing difficulty and cost are also relatively low, which can effectively improve the cost performance of the display apparatus 10 of the light source system 200.

Referring to FIG. 1, the modulation device 500 is configured to modulate the source light emitted from the light source system 100 along the light exit path L3 (FIG. 2). The source light includes the excited light and the reflected excitation light transmitted from the reflective region B, and does not include the unconverted excitation light transmitted from the conversion region Y. The modulation device 500 may include any one of a liquid crystal display (LCD), a digital micromirror device (DMD), or a liquid crystal on silicon (LCOS). The number of modulators included in the modulation device 500 may be selected according to actual needs. The following is an example in which the modulation device 500 includes two DMDs, i.e., the display apparatus 10 is a double-DMD projection system.

The modulation device 500 includes two DMDs, and operates in a mode where one DMD is responsible for processing light of one of the three primary colors in the source light, and the other DMD is responsible for processing light of the other two of the three primary colors in a time-sharing manner. Alternatively, in an embodiment, one DMD is responsible for processing light of one of the three primary colors in the source light, the other DMD is responsible for processing light of another of the three primary colors, and light of the remaining primary color is divided into two parts to be processed by the two DMDs, respectively. In other words, the double-DMD projection system includes both temporal and spatial beam splitting.

In the above two implementations, the wavelength conversion device 180 is configured to sequentially output yellow light and blue light. The reflected blue excitation light transmitted from the reflective region B is used as the blue light, and the yellow light is divided into red light and green light before entering the DMD. The red light and the green light each separately enter one DMD and are simultaneously processed. According to different product requirements, blue primary-color light can share the DMD with the red light or the green light. A single DMD can modulate light of one primary color at a time. If the light source system outputs yellow light and blue light sequentially as described in the present disclosure, while the modulation device includes only one DMD, it is necessary to filter out the red or green light in the yellow light at the time of receiving the yellow light, so as to modulate light of one primary color in the yellow light, resulting in the waste of source light emitted from the light source system and low optical efficiency. The modulation device 500 modulates both red and green light, which helps to improve the optical energy utilization of the display apparatus 10. In embodiments with a single DMD, if the wavelength conversion device is equipped with a reflective section, a red (or yellow) phosphor section, and a green phosphor section, and yellow light emitted from a yellow phosphor is filtered to obtain red fluorescence, the wavelength conversion device emits red fluorescence, green fluorescence and blue laser light in a time sequence. The modulation device modulates light of one color at a time, such that the source light emitted from the light source is not wasted.

In addition, the modulation device 500 includes two DMDs that simultaneously emit image light of a red color and image light of a green color to the projection screen. A display apparatus that includes only one DMD can only modulate light of a single primary color and output image light of a single primary color at a time. Therefore, the modulation device 500 provided by the present disclosure includes two DMDs, which helps to improve the brightness of each color image emitted by the display apparatus 10, and also helps to overcome the unsatisfactory color performance of the single-DMD system.

It should be noted that within the scope of the spirit or basic features of the present disclosure, the specific solutions in embodiments are mutually applicable, and for conciseness and in order to avoid repetition, details are not described herein again.

For person skilled in the art, it is apparent that the present disclosure is not limited to the details of the foregoing exemplary embodiments, and that the present disclosure can be implemented in other specific forms without departing from the spirit or basic features of the present disclosure. Therefore, the embodiments should be regarded as exemplary and non-limiting, and the scope of the present disclosure is defined by the appended claims rather than the above description. Therefore, all changes falling within the meaning and scope of equivalent elements of the claims should be included in the present disclosure. Any reference signs in the claims should not be considered as limiting the claims involved. In addition, it is apparent that the word "including" does not exclude other units or steps, and a singular number does not exclude a plural number. A plurality of devices stated in the device claims may also be implemented by a same device or system through software or hardware. Words such as first and second are used to denote names and do not indicate any particular order.

Finally, it should be noted that the foregoing embodiments are only intended to describe, rather than to limit the technical solutions of the present disclosure. Although the present disclosure is described in detail with reference to the preferred embodiments, person of ordinary skill in the art should understand that modifications or equivalent replacements may be made to the technical solutions of the present disclosure without departing from the spirit and scope of the technical solutions of the present disclosure.

What is claimed is:
1. A light source system, comprising:
an excitation light source configured to emit excitation light;
a wavelength conversion device, wherein the wavelength conversion device comprises a substrate having a conversion region and a reflective region, and wherein the conversion region and the reflective region are arranged on a light incident side of the substrate, located in different planes and time-sequentially located in an optical path of the excitation light, a wavelength conversion material is provided on a surface of the con- version region and configured for converting at least a part of the excitation light into excited light, and the reflective region is configured for reflecting the excitation light;

a collection lens assembly configured to guide light exited from the conversion region to propagate along a first direction to obtain first light, and guide the excitation light exited from the reflective region to propagate along a second direction to obtain second light;

a first guide device configured to guide the excited light in the first light to exit along a first optical path; and a second guide device configured to guide the second light to propagate along a second optical path;

wherein the first guide device is further configured to combine the excited light propagating along the first optical path and the second light propagating along the second optical path to obtain source light, and guide the source light to propagate along a light exit path.

2. The light source system according to claim 1, wherein a groove formed in the reflective region, a bottom wall of the groove configured for reflecting the excitation light, and a side wall of the groove connected to a plane of the conversion region; or the conversion region and the reflective region are arranged on a light incident side of the substrate, a groove formed in the conversion region, a wavelength conversion material provided on a bottom wall of the groove and configured for converting at least a part of the excitation light into the excited light, and a side wall of the groove connected to a plane of the reflective region.

3. The light source system according to claim 1, wherein a protruding portion protruding towards the light incident side is provided in the conversion region of the wavelength conversion device, the wavelength conversion material is provided on a surface of the protruding portion and an edge of the protruding portion is connected to a plane of the reflective region.

4. The light source system according to claim 1, wherein the first guide device comprises a first guide element located at an intersection of the first optical path and the second optical path and configured for combining the excited light propagating along the first optical path and the second light propagating along the second optical path to obtain the source light and guiding the source light to propagate along the light exit path.

5. The light source system according to claim 4, wherein the second guide device comprises a reflective element configured for guiding the second light to propagate along the second optical path and guiding at least a part of unconverted excitation light in the first light to propagate along a direction deviating from the second optical path.

6. The light source system according to claim 5, wherein the second guide device further comprises a first lens disposed in the second optical path and configured for receiving and guiding the second light exited from the reflective element, and the unconverted excitation light in the first light exited from the reflective element propagates along the direction deviating from the second optical path and is not irradiated on the first lens.

7. The light source system according to claim 1, wherein the first guide device further comprises a second guide element configured for guiding the excitation light emitted from the excitation light source to pass through the collection lens assembly and be incident on the wavelength conversion device, guiding the excited light in the first light to propagate along the first optical path, and guiding unconverted excitation light in the first light and the second light to be incident on the second guide device.

8. The light source system according to claim 7, wherein the first guide element has a first region and a second region that do not overlap each other, the first region configured for guiding the excited light exited from the second guide element to the light exit path, and the second region configured for guiding the second light exited from the second guide device to the light exit path.

9. The light source system according to claim 1, wherein a first homogenizing device for homogenizing the excitation light is disposed between the excitation light source and the wavelength conversion device, and/or a second homogenizing device for homogenizing light exited from the first guide element is disposed in the light exit path.

10. The light source system according to claim 9, wherein the first homogenizing device and/or the second homogenizing device comprises a single fly-eye lens, a double fly-eye lens or an optical integrator rod.

11. The light source system according to claim 1, further comprising a supplementary light source for emitting supplementary light, wherein the second guide device is configured for guiding the supplementary light and the second light to be combined and propagate along the second optical path.

12. The light source system according to claim 11, wherein the second guide device further comprises a third guide element configured for combining the supplementary light and the second light and outputting combined light to the first guide element, the first guide element configured for combining the excited light, the second light, and the supplementary light, and the source light comprising the supplementary light.

13. The light source system according to claim 1, wherein an incident position of the excitation light on the collection lens assembly is deviated from an optical axis of the collection lens assembly, such that the excitation light is obliquely incident on a surface of the wavelength conversion device after passing through the collection lens assembly.

14. A display apparatus, comprising:
the light source system according to claim 1; and
a modulation device configured to modulate source light output from the light source system to obtain image light of an image to be displayed.

* * * * *